United States Patent
Hankins, II

(10) Patent No.: US 7,108,194 B1
(45) Date of Patent: Sep. 19, 2006

(54) REMOTE CONTROLLED THERMOSTAT SYSTEM FOR THE SIGHT-IMPAIRED

(76) Inventor: Robert E. Hankins, II, 110 Nasson La., Oak Ridge, TN (US) 37830

( * ) Notice: Subject to any disclaimer, the term of this patent is extended or adjusted under 35 U.S.C. 154(b) by 217 days.

(21) Appl. No.: 10/857,675

(22) Filed: Jun. 1, 2004

(51) Int. Cl.
*G05D 23/00* (2006.01)
*F23N 5/20* (2006.01)

(52) U.S. Cl. .............................. 236/51; 236/94; 62/127; 62/130

(58) Field of Classification Search ................. 62/125, 62/126, 127, 129, 130, 131, 161, 162, 163, 62/164; 236/51, 94; 165/11.1, 11.2
See application file for complete search history.

(56) References Cited

U.S. PATENT DOCUMENTS

| | | | |
|---|---|---|---|
| 3,133,269 A | 5/1964 | Cotsworth, III | |
| 4,864,102 A | 9/1989 | Slack | |
| 4,945,943 A * | 8/1990 | Cogger | 137/360 |
| D359,698 S | 6/1995 | Pierret et al. | |
| 5,454,510 A * | 10/1995 | Manson et al. | 236/51 |
| 5,590,831 A * | 1/1997 | Manson et al. | 236/51 |
| 5,644,302 A | 7/1997 | Hana et al. | |
| 6,152,375 A | 11/2000 | Robison | |
| 6,260,765 B1 * | 7/2001 | Natale et al. | 236/51 |
| 6,394,359 B1 | 5/2002 | Morgan | |
| 6,631,619 B1 * | 10/2003 | Nonaka et al. | 62/126 |
| 6,686,911 B1 * | 2/2004 | Levin et al. | 345/184 |

* cited by examiner

*Primary Examiner*—Harry B. Tanner
(74) *Attorney, Agent, or Firm*—Donald R. Schoonover

(57) ABSTRACT

A thermostat remote control system includes a transmitter/receiver unit hard wired to a building climate control thermostat and a remote control unit that communicates with the hard-wired transmitter/receiver unit via wireless signals. The remote control unit includes braille labels associated with the control elements and further includes sound generators that generate audible signals that correspond to the temperature sensed by the thermostat and that also correspond to actions taken using the remote control.

5 Claims, 2 Drawing Sheets

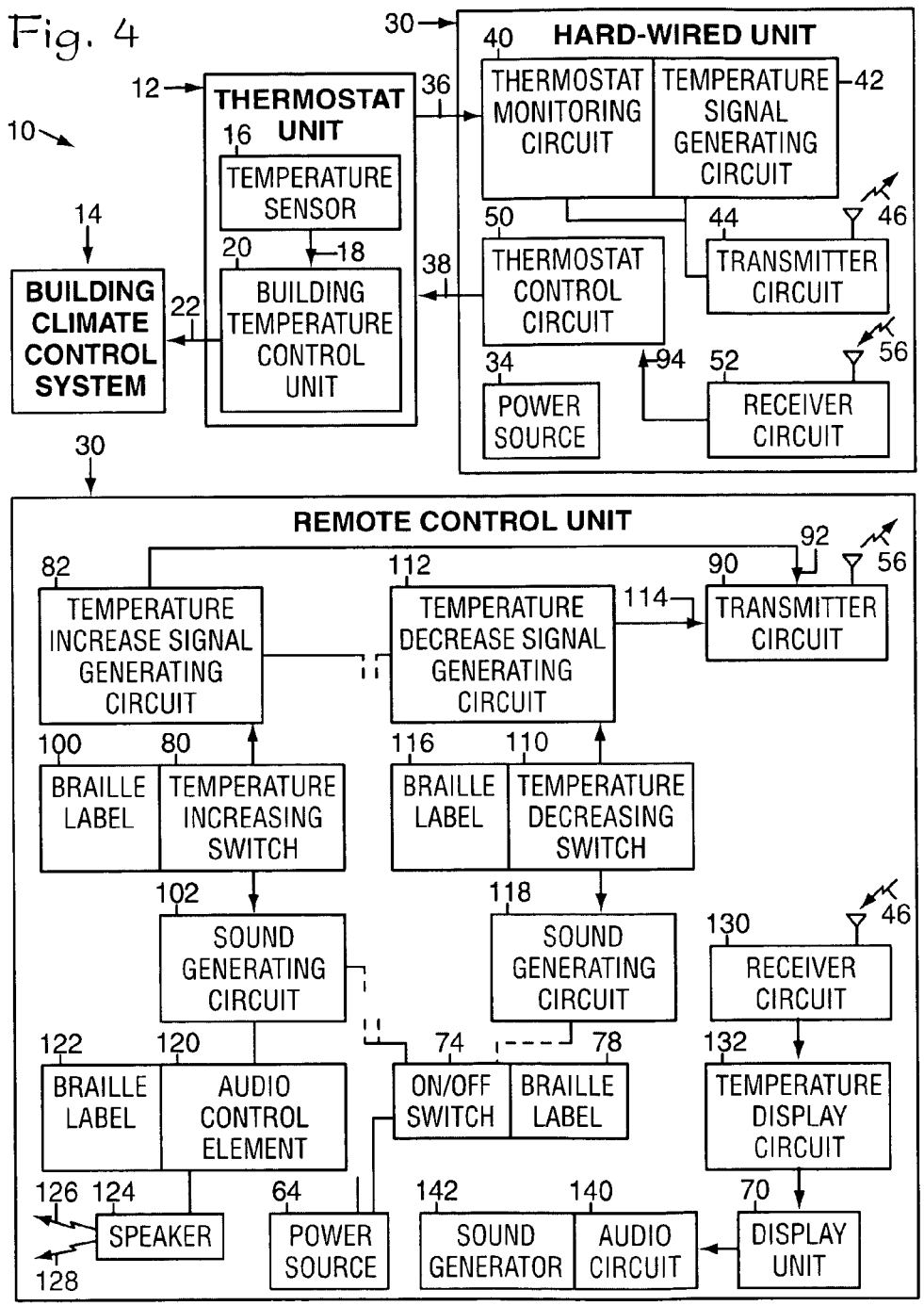

REMOTE CONTROLLED THERMOSTAT SYSTEM FOR THE SIGHT-IMPAIRED

BACKGROUND OF THE INVENTION

1. Field of the Invention

The present invention relates to the general art of automatic temperature and humidity regulation, and to the particular field of automatic temperature and humidity regulation which is remotely adjusted.

2. Discussion of the Related Art

Many people desire to adjust the temperature in their home to one level during the day and another level at night. Sometimes, people desire to adjust the temperature several times during the day. While this is a minor inconvenience for many people, it can be an onerous task for a disabled person. It may even be impossible for a bedridden person.

While the art contains several examples of remotely controlled thermostats, such presently existing systems are not amenable for use by the disabled.

Therefore, there is a need for a remotely controlled thermostat system that is amenable for use by a disabled person.

Nearly every thermostat, or thermostat system, displays temperature. This temperature display is used to identify present ambient temperature and as a guide to setting desired ambient temperature. While this is convenient for most people, a sight-impaired individual, or a person attempting to use and set the system at night or in the dark may find such displays nearly useless.

Therefore, there is a need for a remotely controlled thermostat system that is amenable for use by a sight-impaired person.

To be most commercially acceptable, any system should be amenable to retrofitting existing systems. This will enable someone to modify their existing system with only minor adjustments thereby making a modification of the existing system cost- and time-effective.

Therefore, there is a need for a remotely controlled thermostat system that is amenable for use by a sight-impaired person and which can be easily and quickly retro-fit to an existing system.

PRINCIPAL OBJECTS OF THE INVENTION

It is a main object of the present invention to provide a remotely controlled thermostat system that is amenable for use by a disabled person.

It is another object of the present invention to provide a remotely controlled thermostat system that is amenable for use by a sight-impaired person.

It is another object of the present invention to provide a remotely controlled thermostat system that is amenable for use by a sight-impaired person and which can be easily and quickly retro-fit to an existing system.

It is another object of the present invention to provide a remotely controlled thermostat system that is amenable for use in the dark.

SUMMARY OF THE INVENTION

These, and other, objects are achieved by a thermostat remote control system which comprises a thermostat unit associated with a building climate control system, the thermostat unit including a thermostat control circuit and a temperature sensor circuit, the thermostat control circuit connected to a building climate control system to control temperature of a building via the building climate control system and a temperature sensor; a hard-wired unit electrically connected to the thermostat unit, the hard-wired unit including a thermostat temperature control circuit electrically connected to the thermostat control circuit of the thermostat unit, a transmitter circuit connected to the temperature sensor circuit of the thermostat unit and including a temperature signal generator which generates wireless temperature monitoring signals, and a receiver circuit which is electrically connected to the thermostat temperature control circuit of the hard-wired unit and which receives wireless temperature control signals, the receiver circuit generating a temperature control signal that corresponds to a received wireless temperature control signal in response to the received wireless temperature control signal, the temperature control signal being sent to the thermostat temperature control circuit of the hard-wired unit; and a remote control unit which includes a receiver circuit which receives wireless temperature monitoring signals generated by the transmitter circuit of the hard-wired unit, a display unit electrically connected to the receiver circuit of the remote control unit, the display unit having a display that is controlled by the receiver circuit of the remote control unit and which displays a temperature corresponding to the temperature sensed by the temperature sensor circuit of the thermostat unit; a transmitter circuit which includes a generator which generates wireless temperature control signals, a temperature-increasing switch which is electrically connected to the transmitter circuit of the remote control unit to activate the transmitter circuit to generate a wireless temperature-increasing control signal when the temperature-increasing switch is activated, a braille label associated with the temperature-increasing switch, a sound-generating circuit electrically connected to the temperature-increasing switch, the sound-generating circuit generating a first audible signal when the temperature-increasing switch is activated, a temperature-decreasing switch which is electrically connected to the transmitter circuit of the remote control unit to activate the transmitter circuit to generate an wireless temperature-decreasing control signal when the temperature-decreasing switch is activated, a braille label associated with the temperature-decreasing switch, a sound-generating circuit electrically connected to the temperature-decreasing switch, the sound-generating circuit generating a second audible signal when the temperature-decreasing switch is activated, the second audible signal generated by the sound-generating circuit connected to the temperature-decreasing switch being different from the first audible signal generated by the sound-generating circuit connected to the temperature-increasing switch, and a temperature display sound-generating circuit on the remote control unit electrically connected to the temperature sensor circuit of the thermostat and which generates an audible signal associated with temperature sensed by the temperature sensor circuit of the thermostat, the audible signal associated with the temperature display sound-generating circuit being different from the first audible signal associated with the temperature-increasing switch and different from the second audible signal associated with the temperature-decreasing switch.

The device embodying the present invention is amendable to use by a sight-impaired individual because he or she can easily find the switches that need to be operated by finding the braille labels, and then can operate the switches and listen for the sounds to determine first what the present temperature is and then how much the temperature is increased or decreased. This can be used in the dark as well.

The device is easily and quickly retro-fit to any existing thermostat by hard wiring so an existing system is quickly and easily modified as required.

BRIEF DESCRIPTION OF THE DRAWING FIGURES

FIG. 4 is a schematic representation of the thermostat remote control system embodying the present invention.

DETAILED DESCRIPTION OF THE PREFERRED EMBODIMENT

Figure 1:
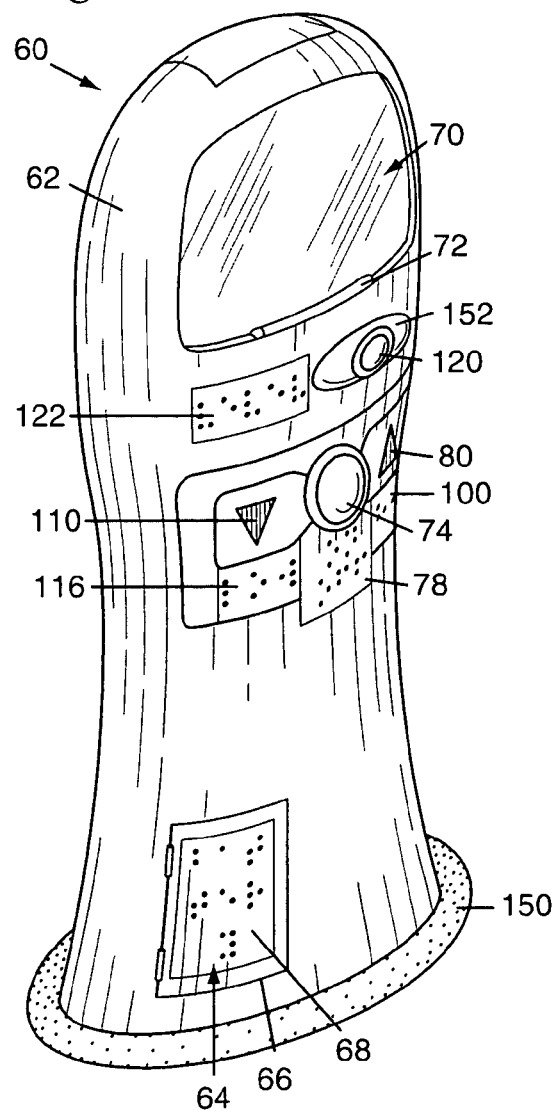
FIG. 1 is a perspective view of a remote control unit included in the thermostat remote control system embodying the present invention.
Figure 2:
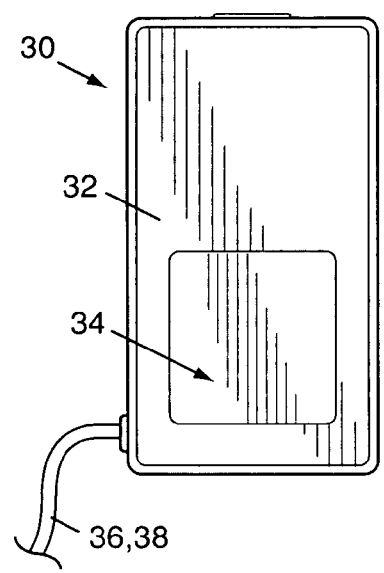
FIG. 2 is a front elevational view of a hard-wired unit included in the thermostat remote control system embodying the present invention.
Figure 3:
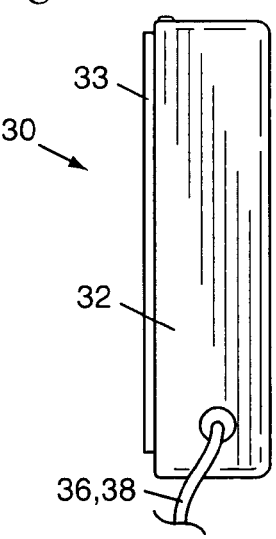
FIG. 3 is a side elevational view of the hard-wired unit shown in FIG. 2.

Other objects, features and advantages of the invention will become apparent from a consideration of the following detailed description and the accompanying drawings.

Referring to the Figures, it can be understood that the present invention is embodied in a thermostat remote control system 10. System 10 can be used by a sight-impaired and/or bedridden person to adjust the ambient temperature in a room. System 10 comprises a thermostat unit 12 associated with a building climate control system 14 such as a heating and/or air conditioning system. The thermostat unit 12 includes a temperature sensor 16 that senses temperature of the building and generates temperature signals 18 associated with the temperature sensed by the temperature sensor 16. A building temperature control circuit 20 is electrically connected to the temperature sensor 16 to receive temperature signals 18 from the temperature sensor 16 and is connected to the building climate control system 14 by a lead line 22 to control building temperature in accordance with temperature signals 18 received from the temperature sensor 16 in response to temperature signals 18 received from the temperature sensor 16.

A hard-wired unit 30 includes a housing 32. A wall-mounting element 33 on the housing 32 is adapted to mount the housing 32 on a wall. Preferably, housing 32 is mounted on a wall adjacent to the thermostat unit 12. Hard-wired unit 30 also includes a power source 34 in the housing 32. Power source 34 can be a battery or the unit 30 can be wired to building power.

A first lead line 36 is electrically connected to the temperature sensor 16 of the thermostat unit 12 and a second lead line 38 is electrically connected to the building temperature control circuit 20 of thermostat unit 12. Unit 30 is thus hard-wired to the thermostat unit 12.

Unit 30 further includes a thermostat-monitoring circuit 40 that is electrically connected to first lead line 36 to be electrically connected to the temperature sensor 16 of the thermostat unit 12 to receive temperature signals 18 from the temperature sensor 16 of the thermostat-monitoring circuit 40. The thermostat-monitoring circuit 40 includes a temperature signal-generating circuit 42 which generates temperature-monitoring signals associated with the temperature signals 16 received by the monitoring circuit 40 from the thermostat temperature sensor 16 in response to the temperature signals 18 received from the thermostat temperature sensor 16.

A transmitter circuit 44 is electrically connected to the thermostat-monitoring circuit 40 to receive temperature-monitoring signals from the thermostat-monitoring circuit 40 and generate wireless temperature-monitoring signals, indicated in FIG. 4 as wireless signal 46, that are associated with the temperature-monitoring signals received by the transmitter circuit 44 from the thermostat-monitoring circuit 40 in response to the temperature-monitoring signals received from the thermostat-monitoring circuit 40.

A thermostat control circuit 50 is electrically connected to second lead line 38 and is also electrically connected via the second lead line to building temperature control circuit 20 of the thermostat unit 12 to control the building temperature via building temperature control circuit 20 of the thermostat unit 12. A receiver circuit 52 receives wireless signals, indicated in FIG. 4 as wireless signal 56, and is electrically connected to thermostat control circuit 50 and generates control signals associated with the wireless signals received by the receiver circuit 52 in response to the wireless signals received by the receiver circuit 52. The control signals are sent to the thermostat control circuit 50 of the hard-wired unit 30 and via the thermostat control circuit 50 of the hard-wired unit 30 to building temperature control circuit 20 of the thermostat unit 12 and via the building temperature control circuit 20 of the thermostat unit 12 to the building climate control system 14. The thermostat building temperature control circuit 20 is controlled in accordance with the wireless signals received by the receiver circuit 52 of the hard-wired unit 30.

A remote control unit 60 includes a housing 62 that can be shaped to comfortably fit into a user's hand, a power source 64, and a door 66 associated with the power source 64. Door 66 can include a logo or the like if desired or can include a braille label 68 to indicate that the power source 64 is located behind the door 66.

A display unit 70 is located on the housing 62 of the remote control unit 60 and can be an LED unit or the like. Display unit 70 can be backlit to assist someone in the dark, and can include a light 72 if suitable.

An on/off switch 74 is electrically connected to the power source 64 of the remote control unit 60 and has an "on" condition and an "off" condition. The switch 74 can be moved between the two conditions by pressing the switch 74. A braille label 78 is associated with the on/off switch 74 of the remote control unit 60 so a sight-impaired user can identify which switch is the on/off switch 74.

A temperature-increasing switch 80 is located on the housing 62 of the remote control unit 60, and a temperature-increasing signal-generating circuit 82 is electrically connected to the temperature-increasing switch 80 and to the power source 64 of the remote control unit 60. Circuit 82 generates temperature-increasing signals when the temperature-increasing switch 80 is activated, such as by pressing, and the on/off switch 74 is in an "on" condition.

A wireless signal-transmitting circuit 90 is electrically connected to the temperature-increasing signal-generating circuit 82 to receive temperature-increasing signals, such as signal 92 indicated in FIG. 4, from the temperature-increasing signal-generating circuit 82 and generates wireless temperature increase signals, such as wireless signal 56 indicated in FIG. 4, associated with the temperature-increasing signals received by the wireless signal-transmitting circuit 90 in response to temperature-increasing signals 92 received from the temperature-increasing signal-generating circuit 82. The wireless temperature increase signals are received by receiver circuit 52 of the hard-wired unit 30. The receiver circuit 52 of the hard-wired unit 30 generates a temperature increase control signal, indicated as signal 94 in FIG. 4, in response to the wireless temperature increase signal received from the transmitter circuit 90 of the remote unit 60.

A braille label 100 is associated with the temperature-increasing switch 80 on the housing 62 of the remote control unit 60.

A sound-generating circuit 102 is electrically connected to the power source 64 of the remote control unit 60 and is electrically connected to the temperature-increasing switch 80 via the on/off switch 74 to emit a sound-generating signal when the temperature-increasing switch 80 is activated and the on/off switch 74 is "on".

A temperature-decreasing switch 110 is located on the housing of the remote control unit 60. A temperature-decreasing signal-generating circuit 112 is electrically connected to the temperature-decreasing switch 110 and to the power source 64 of the remote control unit 60 and generates temperature-decreasing signals, indicated in FIG. 4 as signals 114, when the temperature-decreasing switch 110 is activated and the on/off switch 74 is in an "on" condition.

The temperature-decreasing signal-generating circuit 112 is electrically connected to the wireless signal-transmitting circuit 90 so the wireless signal-transmitting circuit 90 receives temperature-decreasing signals 114 from the temperature-decreasing signal-generating circuit 112 and generates wireless temperature decrease signals, such as signal 56, associated with the temperature-decreasing signals 114 received from the temperature-decreasing signal-generating circuit 112 in response to temperature-decreasing signals 114 received from the temperature-decreasing signal-generating circuit 112. The wireless temperature decrease signals are received by receiver circuit 52 of the hard-wired unit 30. Receiver circuit 52 of the hard-wired unit 30 generates a temperature decrease control signal in response to the wireless temperature decrease signal received from the wireless transmitting circuit 90 of the remote unit 60.

A braille label 116 is associated with the temperature-decreasing switch 110 on the housing 62 of the remote control unit 60. A sound-generating circuit 118 is electrically connected to the power source 64 on the remote control unit 60 via the on/off switch 74 and is electrically connected to the temperature-decreasing switch 110 via the on/off switch 74 to emit a sound-generating signal when the temperature-decreasing switch 110 is activated and the on/off switch 74 is "on".

An audio control element 120 is on the remote control unit 60, and is electrically connected to the sound-generating circuit 102 connected to the temperature-increasing switch 80 and to the sound-generating circuit 118 connected to the temperature-decreasing switch 110 to control the level of the sound-generating signals emitted by the sound-generating circuit 102 connected to the temperature-increasing switch 80 and by the sound-generating circuit 118 connected to the temperature-decreasing switch 110. A braille label 122 is located on the remote control unit 60 adjacent to the audio control element 120.

A sound-generating speaker 124 is on the remote control unit 60. Sound-generating speaker 124 is electrically connected via the audio control element 120 to the sound-generating circuit 102 connected to the temperature-increasing switch 80 and to the sound-generating circuit 118 connected to the temperature-decreasing switch 110 via the audio control element 120. The sound-generating speaker 124 generates a first audible signal 126 when the temperature-increasing switch 80 is activated and a second audible signal 128 when the temperature-decreasing switch 110 is activated. First audible signal 126 is different from second audible signal 128 so a sight-impaired user can distinguish whether the temperature is being increased or decreased.

The remote control unit 60 further includes a receiver circuit 130 which receives wireless signals, such as wireless signal 46, from transmitter circuit 44 of the hard-wired unit 30. The wireless signals 46 received by the receiver circuit 130 of the remote control unit 60 correspond to temperature readings of the temperature sensor 16 of the thermostat unit 12 and are generated by the transmitter circuit 44 of the hard-wired unit 30 in response to signals received by the transmitter circuit 44 of the hard-wired unit 30 from the temperature sensor 16 of the thermostat unit 12 via the thermostat-monitoring circuit 40 of the hard-wired unit 30.

A temperature display circuit 132 electrically connects display unit 70 of the remote control unit 60 to receiver circuit 130 of the remote control unit 60 to display visual signals on the display unit 70 which correspond to the wireless temperature-monitoring signals received by the receiver circuit 130 of the remote control unit 60 from the transmitter circuit 44 of the hard-wired unit 30 in response to the wireless temperature-monitoring signals received by the receiver circuit 130 of the remote control unit 60 from the transmitter circuit 44 of the hard-wired unit 30.

An audio circuit 140 is electrically connected to temperature display circuit 132 of the remote control unit 60 via display unit 70. Audio circuit 140 includes a sound generator 142 which generates audible signals which correspond to the wireless temperature-monitoring signals 46 received by the receiver circuit 130 of the remote control unit 60 from the transmitter circuit 44 of the hard-wired unit 30 in response to the wireless temperature-monitoring signals 46 received by the receiver circuit 130 of the remote control unit 60 from the transmitter circuit 44 of the hard-wired unit 30. For example, a first set of audio signals can be generated for the tens digits in the thermostat temperature sensor 16 and a second set of audio signals can be generated for the units digits in the thermostat temperature sensor 16. The audio signals associated with the readings in the thermostat temperature sensor 16 can be different from the audio signals associated with increasing or decreasing the temperature using the switches 80 and 110.

A supporting element 150 is positioned on the remote control unit 60. The supporting element 150 can include a rubber base so the remote control unit 60 is stable when it is left standing. The housing 62 can also be shaped to comfortably fit into a user's hand.

The thermostat remote control system 10 of the present invention can also include a lighting element 152 associated with audio control element 120 on the remote control unit 60. The lighting element 152 can be used by those who have some sight or those who use the remote control unit 60 in the dark.

It is understood that while certain forms of the present invention have been illustrated and described herein, it is not to be limited to the specific forms or arrangements of parts described and shown.

What is claimed and desired to be covered by Letters Patent is as follows:

1. A thermostat remote control system comprising:
    a) a thermostat unit associated with a building climate control system, said thermostat unit including
        (1) a temperature sensor that senses temperature of the building and generates temperature signals associated with the temperature sensed by the temperature sensor, and
        (2) a building temperature control circuit that is electrically connected to the temperature sensor to receive temperature signals from the temperature sensor and is connected to the building climate control system to control building temperature in accordance with temperature signals received from the temperature sensor in response to temperature signals received from the temperature sensor;

b) a hard-wired unit which includes
  (1) a housing,
  (2) a wall-mounting element on the housing adapted to mount the housing on a wall,
  (3) a power source in the housing,
  (4) a first lead line which is electrically connected to the temperature sensor of said thermostat unit and a second lead line which is electrically connected to the building temperature control circuit of said thermostat unit,
  (5) a thermostat-monitoring circuit that is electrically connected to the first lead line to be electrically connected to the temperature sensor of said thermostat unit to receive temperature signals from the temperature sensor the thermostat-monitoring circuit, the thermostat-monitoring circuit including a temperature signal-generating circuit which generates temperature-monitoring signals associated with the temperature signals received by the monitoring circuit from the thermostat temperature sensor in response to the temperature signals received from the thermostat temperature sensor,
  (6) a transmitter circuit electrically connected to the thermostat-monitoring circuit to receive temperature-monitoring signals from the thermostat-monitoring circuit and generate wireless temperature-monitoring signals that are associated with the temperature-monitoring signals received by the transmitter circuit from the thermostat-monitoring circuit in response to the temperature-monitoring signals received from the thermostat-monitoring circuit,
  (7) a thermostat control circuit which is electrically connected to the second lead line and which also is electrically connected via the second lead line to the building temperature control circuit of said thermostat unit to control the building temperature via the building temperature control circuit of said thermostat, and
  (8) a receiver circuit which receives wireless signals and which is electrically connected to the thermostat control circuit and which generates control signals associated with the wireless signals received by the receiver circuit in response to the wireless signals received by the receiver circuit, the control signals being sent to the thermostat control circuit of said hard-wired unit and via the thermostat control circuit of said hard-wired unit to the building temperature control circuit of said thermostat unit and via the building temperature control circuit of said thermostat unit to said building climate control system, the thermostat building temperature control circuit being controlled in accordance with the wireless signals received by the receiver circuit of said hard-wired unit; and c) a remote control unit which includes
  (1) a housing,
  (2) a power source,
  (3) a display unit on the housing of said remote control unit,
  (4) an on/off switch electrically connected to the power source of said remote control unit,
  (5) a braille label associated with the on/off switch of said remote control unit,
  (6) a temperature-increasing switch on the housing of said remote control unit,
  (7) a temperature-increasing signal-generating circuit which is electrically connected to the temperature-increasing switch and to the power source of said remote control unit and which generates temperature-increasing signals when the temperature-increasing switch is activated and the on/off switch is in an "on" condition,
  (8) a wireless signal-transmitting circuit which is electrically connected to the temperature-increasing signal-generating circuit to receive temperature-increasing signals from the temperature-increasing signal-generating circuit and generate wireless temperature increase signals associated with the temperature-increasing signals received by the wireless signal-transmitting circuit in response to temperature-increasing signals received from the temperature-increasing signal-generating circuit, the wireless temperature increase signals being received by the receiver circuit of said hard-wired unit, the receiver circuit of said hard-wired unit generating a temperature increase control signal in response to the wireless temperature increase signal received from the transmitter circuit of said remote unit,
  (9) a braille label associated with the temperature-increasing switch on the housing of said remote control unit,
  (10) a sound-generating circuit which is electrically connected to the power source on said remote control unit and which is electrically connected to the temperature-increasing switch via the on/off switch to emit a sound-generating signal when the temperature-increasing switch is activated and the on/off switch is "on",
  (11) a temperature-decreasing switch on the housing of said remote control unit,
  (12) a temperature-decreasing signal-generating circuit which is electrically connected to the temperature-decreasing switch and to the power source of said remote control unit and which generates temperature-decreasing signals when the temperature-decreasing switch is activated and the on/off switch is in an "on" condition,
  (13) the temperature-decreasing signal-generating circuit which is electrically connected to the wireless signal-transmitting circuit so the wireless signal-transmitting circuit receives temperature-decreasing signals from the temperature-decreasing signal-generating circuit and generates wireless temperature decrease signals associated with the temperature-decreasing signals received from the temperature-decreasing signal-generating circuit in response to temperature-decreasing signals received from the temperature-decreasing signal-generating circuit, the wireless temperature decrease signals being received by the receiver circuit of said hard-wired unit, the receiver circuit of said hard-wired unit generating a temperature decrease control signal in response to the wireless temperature decrease signal received from the wireless transmitting circuit of said remote unit,

(14) a braille label associated with the temperature-decreasing switch on the housing of said remote control unit,
(15) a sound-generating circuit which is electrically connected to the power source on said remote control unit via the on/off switch and which is electrically connected to the temperature-decreasing switch via the on/off switch to emit a sound-generating signal when the temperature-decreasing switch is activated and the on/off switch is "on",
(16) an audio control element on said remote control unit, the audio control element being electrically connected to the sound-generating circuit connected to the temperature-increasing switch and to the sound-generating circuit connected to the temperature-decreasing switch to control the level of the sound-generating signals emitted by the sound-generating circuit connected to the temperature-increasing switch and by the sound-generating circuit connected to the temperature-decreasing switch,
(17) a braille label located on said remote control unit adjacent to said audio control element,
(18) a sound-generating speaker on said remote control unit, the sound-generating speaker being electrically connected via the audio control element to the sound-generating circuit connected to the temperature-increasing switch and to the sound-generating circuit connected to the temperature-decreasing switch via the audio control element, the sound-generating speaker generating a first audible signal when the temperature-increasing switch is activated and a second audible signal when the temperature-decreasing switch is activated, with the first audible signal being different from the second audible signal,
(19) a receiver circuit which receives wireless signals from the transmitter circuit of said hard-wired unit, the wireless signals received by the receiver circuit of said remote control unit corresponding to temperature readings of the temperature sensor of said thermostat unit and are generated by the transmitter circuit of said hard-wired unit in response to signals received by the transmitter circuit of said hard-wired unit from the temperature sensor of said thermostat via the thermostat-monitoring circuit of said hard-wired unit,
(20) a temperature display circuit electrically connecting the display unit of said remote control unit to the receiver circuit of said remote control unit to display visual signals on the display unit which correspond to the wireless temperature-monitoring signals received by the receiver unit of said remote control unit from the transmitter circuit of said hard-wired unit in response to the wireless temperature-monitoring signals received by the receiver unit of said remote control unit from the transmitter circuit of said hard-wired unit,
(21) an audio circuit electrically connected to the temperature display circuit of said remote control unit, the audio circuit including a sound generator which generates audible signals which correspond to the wireless temperature-monitoring signals received by the receiver unit of said remote control unit from the transmitter circuit of said hard-wired unit in response to the wireless temperature-monitoring signals received by the receiver unit of said remote control unit from the transmitter circuit of said hard-wired unit, the sound generator of the audio circuit on said remote control unit generating a first audio signal associated with tens digits in a temperature sensed by the temperature sensor of said thermostat and a second audio signal associated with units digits in the temperature sensed by the temperature sensor of said thermostat unit, the first and second audio signals of the audio circuit being different from each other and from the first audible signal associated with the temperature-increasing switch and from the second audible signal associated with the temperature-decreasing switch, and
(22) a supporting element on said remote control unit.

2. The thermostat remote control system as described in claim 1 wherein said remote control unit further includes a lighting element associated with the on/off switch and the temperature-increasing switch and the temperature-decreasing switch.

3. The thermostat remote control system as described in claim 2 wherein said remote control unit further includes a lighting element associated with the display unit.

4. The thermostat remote control system as described in claim 3 wherein said remote control unit further includes a lighting element associated with the audio control element on said remote control unit.

5. A thermostat remote control system comprising:
a) a thermostat unit associated with a building climate control system, said thermostat unit including a thermostat control circuit and a temperature sensor circuit, the thermostat control circuit connected to a building climate control system to control temperature of a building via the building climate control system and a temperature sensor;
b) a hard-wired unit electrically connected to said thermostat unit, said hard-wired unit including
(1) a thermostat temperature control circuit electrically connected to the thermostat control circuit of said thermostat unit,
(2) a transmitter circuit connected to the temperature sensor circuit of said thermostat unit and including a temperature signal generator which generates wireless temperature-monitoring signals, and
(3) a receiver circuit which is electrically connected to the thermostat temperature control circuit of said hard-wired unit and which receives wireless temperature control signals, the receiver circuit generating a thermostat temperature control signal that corresponds to a received wireless temperature control signal in response to the received wireless temperature control signal, the thermostat temperature control signal being sent to the temperature control circuit of said hard-wired unit; and
c) a remote control unit which includes
(1) a receiver circuit which receives wireless temperature-monitoring signals generated by the transmitter circuit of said hard-wired unit,
(2) a display unit electrically connected to the receiver circuit of said remote control unit, the display unit having a display that is controlled by the receiver circuit of said remote control unit and which displays a temperature corresponding to the temperature sensed by the temperature sensor circuit of said thermostat unit;
(3) a transmitter circuit which includes a generator which generates wireless temperature control signals,
(4) a temperature-increasing switch which is electrically connected to the transmitter circuit of said remote control unit to activate the transmitter circuit to generate a wireless temperature-increasing control signal when the temperature-increasing switch is activated, (5) a braille label associated with the temperature-increasing switch, (6) a sound-generating circuit electrically connected to the temperature-increasing switch, the sound-generating circuit generating a first audible signal when the temperature-increasing switch is activated, (7) a temperature-decreasing switch which is electrically connected to the transmitter circuit of said remote control unit to activate the transmitter circuit to generate a wireless temperature-decreasing control signal when the temperature-decreasing switch is activated, (8) a braille label associated with the temperature-decreasing switch, (9) a sound-generating circuit electrically connected to the temperature-decreasing switch, the sound-generating circuit generating a second audible signal when the temperature-decreasing switch is activated, the second audible signal generated by the sound-generating circuit connected to the temperature-decreasing switch being different from the first audible signal generated by the sound-generating circuit connected to the temperature-increasing switch,

(10) an audio control element on said remote control element and electrically connected to the sound-generating circuit to control the level of sound generated by the sound-generating circuit,

(11) a braille label on said remote control unit adjacent to the audio control element,

(12) a temperature display sound-generating circuit on said remote control unit electrically connected to the temperature sensor circuit of said thermostat and which generates an audible signal associated with temperature sensed by the temperature sensor circuit of said thermostat, the audible signal associated with the temperature display sound-generating circuit being different from the first audible signal associated with the temperature-increasing switch and different from the second audible signal associated with the temperature-decreasing switch.

* * * * *